US008589788B2

(12) United States Patent
Bostian et al.

(10) Patent No.: US 8,589,788 B2
(45) Date of Patent: *Nov. 19, 2013

(54) METHODS, SYSTEMS, AND COMPUTER PROGRAM PRODUCTS FOR AUTOMATIC PARSING OF MARKUP LANGUAGE DOCUMENTS

(75) Inventors: Joseph A. Bostian, Red Hook, NY (US); Christopher B. Larsson, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

This patent is subject to a terminal disclaimer.

(21) Appl. No.: 11/959,511

(22) Filed: Dec. 19, 2007

(65) Prior Publication Data

US 2009/0164882 A1    Jun. 25, 2009

(51) Int. Cl.
*G06F 3/00* (2006.01)

(52) U.S. Cl.
USPC ......................................................... 715/234

(58) Field of Classification Search
USPC .................. 715/209, 234, 239, 243, 254, 255
See application file for complete search history.

(56) References Cited

U.S. PATENT DOCUMENTS

| | | | |
|---|---|---|---|
| 5,386,570 A | | 1/1995 | Lindhorst |
| 5,696,918 A | | 12/1997 | Barker et al. |
| 5,727,220 A | | 3/1998 | Hohensee et al. |
| 5,754,849 A | * | 5/1998 | Dyer et al. .............................. 1/1 |
| 5,758,361 A | * | 5/1998 | van Hoff ........................ 715/236 |
| 5,842,217 A | | 11/1998 | Light |
| 6,195,677 B1 | | 2/2001 | Utsumi |
| 6,199,081 B1 | | 3/2001 | Meyerzon et al. |
| 6,349,344 B1 | | 2/2002 | Sauntry et al. |
| 6,356,920 B1 | | 3/2002 | Vandersluis |
| 6,418,446 B1 | | 7/2002 | Lection et al. |
| 6,530,080 B2 | | 3/2003 | Fresko et al. |
| 6,571,248 B1 | | 5/2003 | Kusama |
| 6,671,853 B1 | | 12/2003 | Burkett et al. |
| 6,684,219 B1 | | 1/2004 | Shaw et al. |
| 6,850,950 B1 | | 2/2005 | Clarke et al. |
| 6,920,609 B1 | | 7/2005 | Manber et al. |

(Continued)

FOREIGN PATENT DOCUMENTS

EP    2096552 A1    9/2009

OTHER PUBLICATIONS

Castro, "XML for the World Wide Web: Visual QuickStart Guide", Oct. 23, 2000, Peachpit Press, p. 22, ISBN 978-0-20171098-4.

(Continued)

*Primary Examiner* — Kyle Stork
(74) *Attorney, Agent, or Firm* — Cantor Colburn LLP; William A. Kinnaman, Jr.

(57) ABSTRACT

A method, system, and computer program product for automatic parsing of a markup language (ML) document are provided. The method includes receiving a request from an ML producer to write an ML document including ML data in a text format. The method also includes passing the ML data in the text format to an ML parser, where the ML parser translates the ML data in the text format into a parsed binary format. The method additionally includes writing the ML data in the text format as a text format ML document to a data storage device, and writing the ML data in the parsed binary format as a parsed binary format ML document to the data storage device.

20 Claims, 5 Drawing Sheets

(56) References Cited

U.S. PATENT DOCUMENTS

| | | | |
|---|---|---|---|
| 6,938,204 B1* | 8/2005 | Hind et al. | 715/234 |
| 6,941,510 B1 | 9/2005 | Ozzie et al. | |
| 6,947,945 B1 | 9/2005 | Carey et al. | |
| 6,959,416 B2* | 10/2005 | Manning et al. | 715/227 |
| 7,162,691 B1 | 1/2007 | Chatterjee et al. | |
| 7,203,692 B2 | 4/2007 | Tabatabai et al. | |
| 7,231,394 B2 | 6/2007 | Walker et al. | |
| 7,240,285 B2 | 7/2007 | Rising, III et al. | |
| 7,500,017 B2 | 3/2009 | Cseri et al. | |
| 7,747,594 B2 | 6/2010 | Probert, Jr. et al. | |
| 7,880,738 B2 | 2/2011 | Abagyan et al. | |
| 2002/0051185 A1 | 5/2002 | Yamaguchi et al. | |
| 2002/0138517 A1 | 9/2002 | Mory et al. | |
| 2002/0156811 A1* | 10/2002 | Krupa | 707/513 |
| 2003/0159112 A1 | 8/2003 | Fry | |
| 2004/0268238 A1 | 12/2004 | Liu et al. | |
| 2005/0050059 A1* | 3/2005 | Van Der Linden et al. | 707/100 |
| 2005/0091231 A1 | 4/2005 | Pal et al. | |
| 2005/0172276 A1 | 8/2005 | Eilebrecht | |
| 2006/0106831 A1* | 5/2006 | Nakanishi | 707/100 |
| 2006/0288019 A1 | 12/2006 | Bauer et al. | |
| 2008/0010378 A1* | 1/2008 | Parker et al. | 709/226 |
| 2009/0164510 A1 | 6/2009 | Bostian | |
| 2009/0199089 A1* | 8/2009 | Bulusu et al. | 715/255 |
| 2009/0222718 A1 | 9/2009 | Wagner et al. | |
| 2010/0058172 A1 | 3/2010 | Soldan et al. | |
| 2010/0299395 A1 | 11/2010 | Klassen | |

OTHER PUBLICATIONS

Fang et al., "A Compressed XML Schema Representation for Metadata Processing in Mobile Environments", Oct. 6, 2006, IEEE, 2006 IEEE 8th Workshop on Multimedia Signal Processing. pp. 493-496.

* cited by examiner

METHODS, SYSTEMS, AND COMPUTER PROGRAM PRODUCTS FOR AUTOMATIC PARSING OF MARKUP LANGUAGE DOCUMENTS

BACKGROUND OF THE INVENTION

The present disclosure relates generally to computer system file management, and, in particular, to automatic parsing of markup language documents.

A markup language (ML) provides a way to combine text and extra information about the text in a text file. The extra information can include data structure, layout, or other information, intermingled with the primary text. An ML can facilitate sharing of structured data across diverse information systems, such as the Internet. ML documents are typically files stored in a text-based format that define and describe information that can be interpreted by both humans and computers. Before an ML document can be consumed by an application, it must first be parsed into its semantic components. Once parsed, the consumer of the ML document knows the purpose and meaning of each item in the ML document. When an application or middleware needs to consume an ML document, the process requires two discrete steps—read, or acquire ML text in a buffer, and then call an ML parser to process the ML text into useful binary objects that can be consumed. The binary objects created by the ML parser are typically dynamic in nature, with the binary objects being created and held temporarily, and destroyed upon consumption. This means that an ML document must be repeatedly parsed every time a consumer reads it. This process adds complexity to processing that every ML document consumer performs, and drives up overall resource usage within a system, as multiple consumers handle ML documents.

Thus, every time an ML document is read, parsing occurs, which consumes significantly more resources than if the parsed information were generated once and kept available for multiple consumers as a persistent version of the ML document. Moreover, ML consumer applications are charged with the task of locating and calling a compatible ML parser, leading to further complications for the ML consumer applications when the ML parser is moved to a different access path or semantics are modified, such as upon a system reconfiguration or update. Accordingly, there is a need in the art for automatic parsing of ML documents at write time and returning the stored parsed version at read time.

BRIEF SUMMARY OF THE INVENTION

Embodiments of the invention include a method for automatic parsing of a markup language (ML) document. The method includes receiving a request from an ML producer to write an ML document including ML data in a text format. The method also includes passing the ML data in the text format to an ML parser, where the ML parser translates the ML data in the text format into a parsed binary format. The method additionally includes writing the ML data in the text format as a text format ML document to a data storage device, and writing the ML data in the parsed binary format as a parsed binary format ML document to the data storage device.

Additional embodiments include system for automatic parsing of an ML document. The system includes a host system in communication with a data storage device, and an ML file manager executing upon the host system. The ML file manager receives a request from an ML producer to write an ML document including ML data in a text format. The ML file manager passes the ML data in the text format to an ML parser, where the ML parser translates the ML data in the text format into a parsed binary format. Additionally, the ML file manager writes the ML data in the text format as a text format ML document to the data storage device, and writes the ML data in the parsed binary format as a parsed binary format ML document to the data storage device.

Further embodiments include computer program product for automatic parsing of an ML document. The computer program product includes a storage medium readable by a processing circuit and storing instructions for execution by the processing circuit for implementing a method. The method includes receiving a request from an ML producer to write an ML document including ML data in a text format. The method also includes passing the ML data in the text format to an ML parser, where the ML parser translates the ML data in the text format into a parsed binary format. The method further includes writing the ML data in the text format as a text format ML document to a data storage device, and writing the ML data in the parsed binary format as a parsed binary format ML document to the data storage device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments provide methods, systems and computer program products for automatic parsing of markup language (ML) documents. Example MLs include extensible markup language (XML), generalized markup language (GML), standard generalized markup language (SGML), hypertext markup language (HTML), extensible hypertext markup language (XHTML), and the like. In exemplary embodiments, a data access method or file system interface triggers parsing of a text format ML document into a parsed binary format, and retains the parsed binary format ML document so that it can be returned to a requester, such as an ML consumer, as needed. While prior art approaches may force ML consumers to perform ML parsing directly or call an ML parser each time that an ML document is accessed, exemplary embodiments as described in further detail herein, create a persistent copy of a parsed binary format ML document such that it can be returned upon future requests to access the ML document. Grouping the text format ML document and the parsed binary format ML document into a single multi-format data object may provide additional and distinct advantages.

Figure 1:
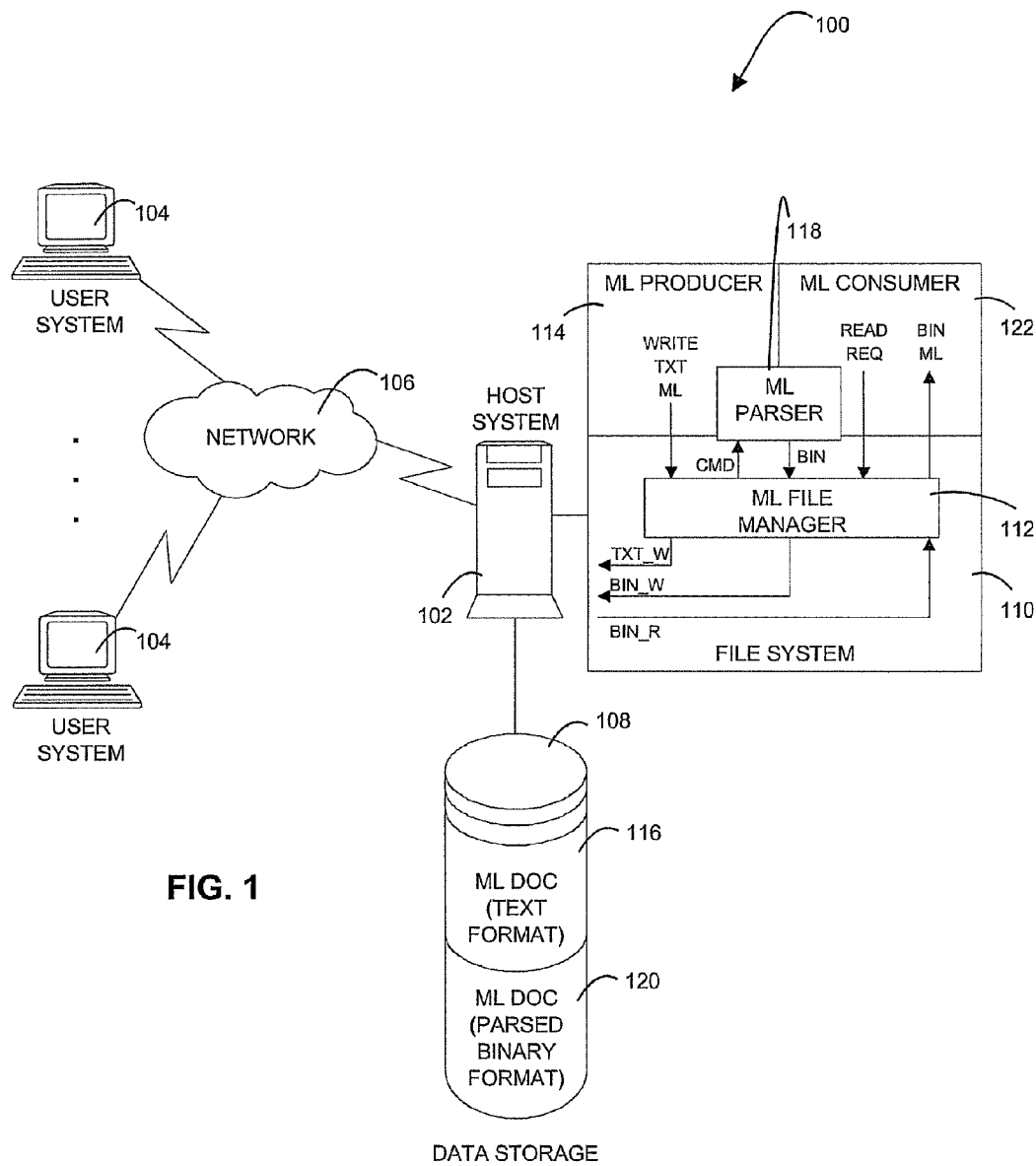
FIG. 1 depicts a system for automatic parsing of an ML document in accordance with exemplary embodiments.

Turning now to the drawings, it will be seen that in FIG. 1 there is a block diagram of a system 100 upon which automatic parsing of ML documents is implemented in exemplary embodiments. The system 100 of FIG. 1 includes a host system 102 in communication with user systems 104 over a network 106. In exemplary embodiments, the host system 102 is a high-speed processing device (e.g., a mainframe computer) including at least one processing circuit (e.g., a CPU) capable of reading and executing instructions, and handling numerous interaction requests from the user systems 104 as a shared physical resource. The host system 102 may perform as a file server for storing and accessing files. The host system 102 can also run other applications, and may serve as a Web server, applications server, and/or a database server. In exemplary embodiments, the user systems 104 comprise desktop, laptop, or general-purpose computer devices that provide an interface for communicating with the host system 102. Users can initiate various tasks on the host system 102 via the user systems 104, such as accessing and storing ML documents. While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The network 106 may be any type of communications network known in the art. For example, the network 106 may be an intranet, extranet, or an internetwork, such as the Internet, or a combination thereof. The network 106 can include wireless, wired, and/or fiber optic links.

In exemplary embodiments, the host system 102 accesses and stores data in a data storage device 108. The data storage device 108 refers to any type of computer readable storage medium and may comprise a secondary storage element, e.g., hard disk drive, tape, or a storage subsystem that is internal or external to the host system 102. Types of data that may be stored in the data storage device 108 include, for example, various files and databases. It will be understood that the data storage device 108 shown in FIG. 1 is provided for purposes of simplification and ease of explanation and is not to be construed as limiting in scope. To the contrary, there may be multiple data storage devices 108 utilized by the host system 102.

In exemplary embodiments, the host system 102 executes various applications, including a file system 110 that controls read and write accesses to the data storage device 108. The file system 110 may include an ML file manager 112 that handles write and read requests of ML documents. The ML file manager 112 can be integrated in the file system 110 as an application program interface (API) service, or the ML file manager 112 can be an independent module or program. In exemplary embodiments, the ML file manager 112 receives an ML document write request from an ML producer 114 to write the ML document in a text format. The ML file manager 112 writes the text format ML document to the data storage device 108 as a text format ML document 116. In exemplary embodiments, the text format ML document 116 includes ML data in a text format. The ML data may include tags for defining various data structures, as well as data associated with the data structures. The text format ML data may be human readable, but not directly consumable by applications requiring a parsed binary format of the ML data.

The text format ML document 116 may be a persistent data object or a text file (e.g., "my_file.XML"). A file extension of the text format ML document 116 can be used by the ML file manager 112 for file type identification (e.g., ".XML"), which can assist the ML file manager 112 in determining the course of action to take for the file. The ML producer 114 may pass an option (e.g., a flag or argument) with a file open command to the file system 110 or the ML file manager 112 to indicate that an ML document write command with parsing is requested.

In addition to writing the text format ML document 116, the ML file manager 112 may command an ML parser 118 to translate the text format ML data into a parsed binary format. Multiple ML parsers 118 may be available for different MLs, with the ML file manager 112 selecting a particular ML parser 118 based on file type identification information. In exemplary embodiments, the ML parser 118 applies algorithms known in the art to semantically analyze the text format ML data to produce binary data structured objects in a parsed binary format that is directly usable and consumable. Upon receiving the ML data in the parsed binary format from the ML parser 118, the ML file manager 112 writes the ML data in the parsed binary format to the data storage device 108 as a parsed binary format ML document 120.

When the ML file manager 112 receives a read request from an ML consumer 122, the ML file manager 112 accesses the parsed binary format ML document 120 to read the ML data in the parsed binary format, and returns the ML data in the parsed binary format to the ML consumer 122. Thus, the ML consumer 122 does not need to know how to directly interface with the ML parser 118. Conversely, path and interfacing requirements for accessing the ML parser 118 may be made known to the ML file manager 112 through a configuration process managed by the file system 110. This approach reduces the burden on both the ML producer 114 and the ML consumer 122, as both may simply interface with the ML file manager 112 as part of the file system 110.

Although the system 100 of FIG. 1 depicts only a single ML producer 114 and ML consumer 122, as well as a single text format ML document 116 and parsed binary format ML document 120, it will be understood that any number ML producers 114, ML consumers 122, and ML documents may be supported by the system 100. In exemplary embodiments, there is a one-to-one relationship between the text format ML document 116 and the parsed binary format ML document 120, as both represent different formats of the same ML document. When multiple ML consumers 122 exist or the ML consumer 122 attempts to repeatedly access the same ML document, significant processing time reductions may be achieved as ML parsing need not be performed repeatedly on each attempt to consume the ML document. "Consuming" refers to the ability of the ML consumer 122 to extract meaningful data or information from an ML document provided to the ML consumer 122 in a parsed binary format.

Figure 2:
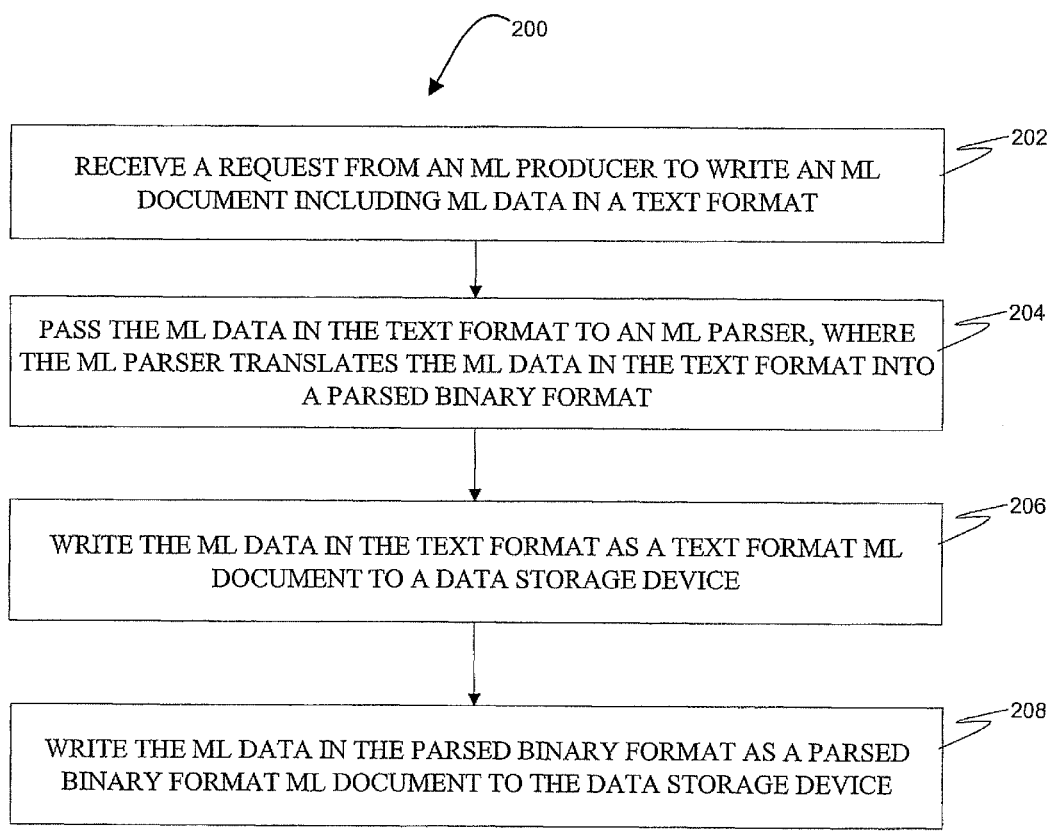
FIG. 2 depicts an exemplary process for automatic parsing of an ML document at write time.

Turning now to FIG. 2, a process 200 for automatic parsing of an ML document at write time will now be described in accordance with exemplary embodiments, and in reference to the system 100 of FIG. 1. At block 202, the ML file manager 112 receives a request to write an ML document, including ML data in a text format, from the ML producer 114. The ML producer 114 may request that the parsed binary format ML document 120 be written to the data storage device 108 in addition to writing the text format ML document 116 to the data storage device 108. The request may be in the form of an option specified at the time a file or data object open request is sent from the ML producer 114 to the ML file manager 112 or the file system 110. Alternatively, extended attributes for a file or a file name extension, such as ".GML", may be used to indicate to the ML file manager 112 or the file system 110 that ML parsing should be performed at write time.

At block 204, the ML file manager 112 passes the ML data in the text format to the ML parser 118, where the ML parser 118 translates the ML data in the text format into a parsed binary format. At block 206, the ML file manager 112 writes the ML data in the text format to the data storage device 108 as the text format ML document 116. At block 208, the ML file manager 112 writes the ML data in the parsed binary format to the data storage device 108 as the parsed binary format ML document 120.

Using the process 200, the ML parser 118 can be invoked automatically upon a write request of the ML producer 114 to the ML file manger 112, and without a specific request by the ML producer 114 or the ML consumer 122 to the ML parser 118. Thus, detailed information that may be necessary to perform ML parsing can be offloaded from both the ML producer 114 and the ML consumer 122 to a simplified and transparent interface managed by the file system 110. Once an ML document has been parsed, and the binary form written to the parsed binary format ML document 120, one or more ML consumers 122 may attempt to open the text format ML document 116, specifying the same ML option at opening as the ML producer 114 specified at write time. A read request of the ML document serviced by the file system 110 or the ML file manager 112 returns data from the parsed binary format ML document 120 to the ML consumer 122. The parsed binary format ML document 120 need not be directly visible to either the ML producer 114 or the ML consumer 122, as the file system 110 can manage reads and writes to the data storage device 108 to provide an appropriate version of the ML document as determined by the ML file manager 112.

Figure 3:
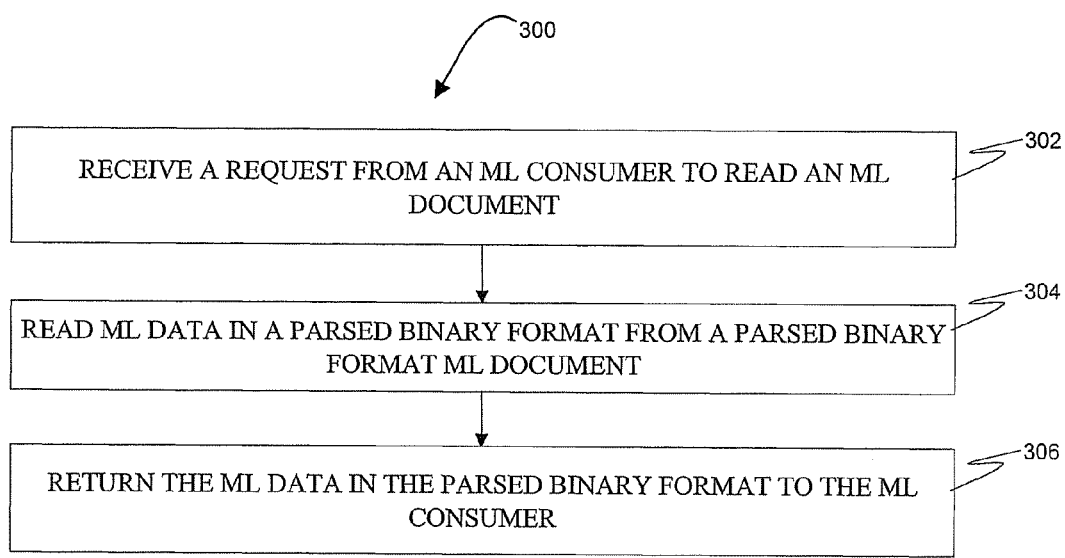
FIG. 3 depicts an exemplary process for consuming an ML document in a parsed binary format.

Turning now to FIG. 3, a process 300 for consuming an ML document in a parsed binary format will now be described in accordance with exemplary embodiments, and in reference to the system 100 of FIG. 1 and the process 200 of FIG. 2. At block 302, the ML file manager 112 receives a request from the ML consumer 122 to read the ML document written in the process 200 of FIG. 2. The request to read the ML document may be received via the ML file manager 112 or the file system 110 as an option passed with a file open command. At block 304, the ML file manager 112 reads the ML data in the parsed binary format from the parsed binary format ML document 120. At block 306, the ML file manager 112 returns the ML data in the parsed binary format to the ML consumer 122. Other file system primitives, such as those for returning file statistics or adjusting a current file offset, may also request ML data in the parsed binary format from the parsed binary format ML document 120.

By integrating parsing functionality with common API services provided by the host system 102 as part of the file system 110, applications and middleware, such as the ML consumer 122, are relieved of the task of parsing the ML data. This not only makes programming the host system 102 easier, it may also reduce overall resource consumption, since multiple ML consumers 122 can all reference a persistent copy of parsed data instead of re-creating it as needed. Embedding the functionality of the ML parser 118 within services of the file system 110, such as open/close/read/write, enables automatic parsing triggered by simply placing an ML document in the file system 110.

Figure 4:
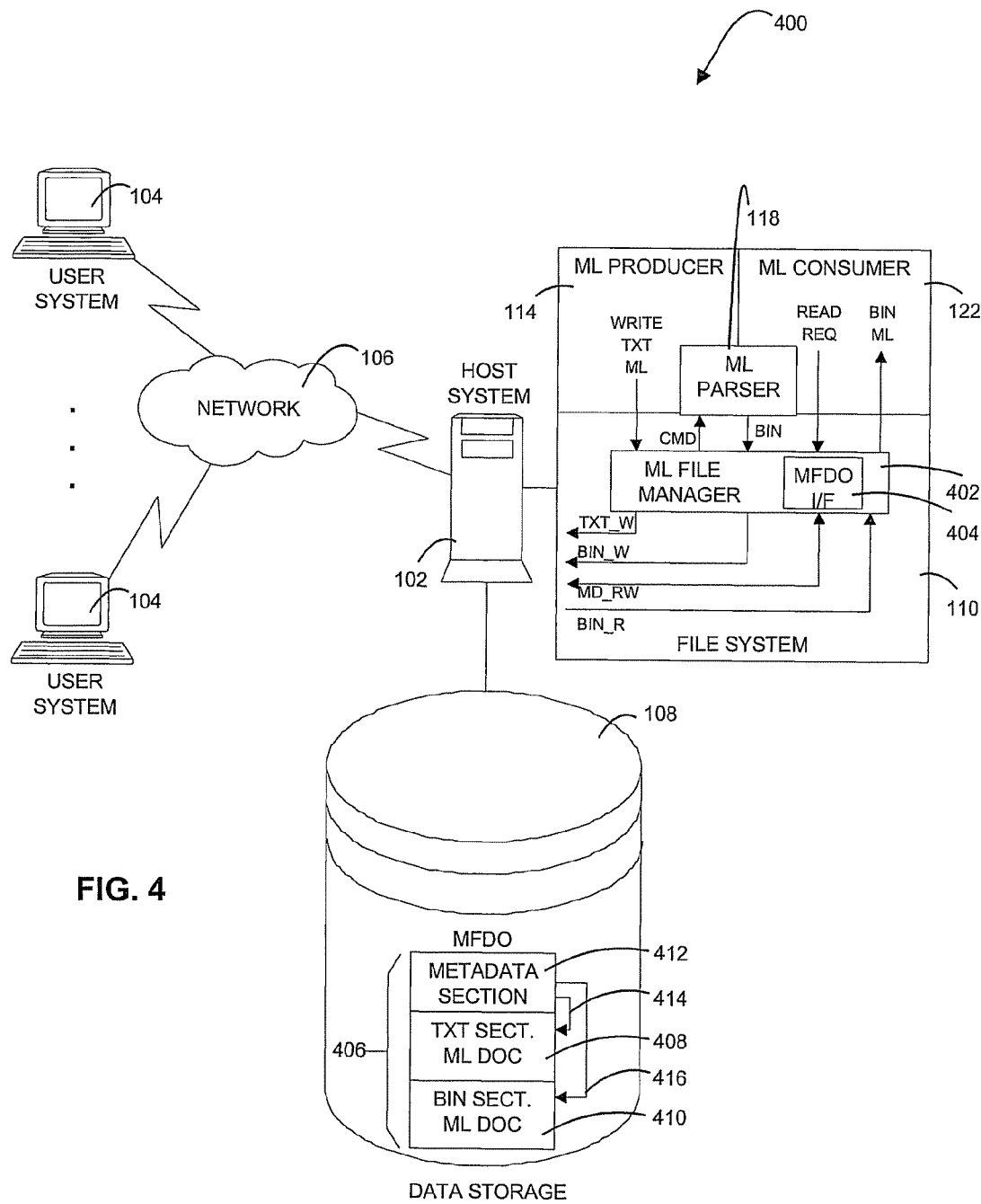
FIG. 4 depicts a system for accessing a multi-format data object that tightly binds an ML document in a text format to a parsed binary representation of the ML document in accordance with exemplary embodiments.

Turning now to FIG. 4, a block diagram of a system 400 is depicted upon which accessing a multi-format data object is implemented in exemplary embodiments. Similar to the system 100 of FIG. 1, the system 400 includes the host system 102 in communication with user systems 104 over network 106. The host system 102 is in communication with the data storage device 108, and the host system 102 executes the file system 110 to control reads and writes to the data storage device 108. However, ML file manager 402 of FIG. 4 differs from the ML file manger 112 of FIG. 1 through the addition of a multi-format data object interface (MFDO I/F) 404. In exemplary embodiments, the MFDO I/F 404 enables the creation of and manages access to a multi-format data object (MFDO) 406 implemented on the data storage device 108. The MFDO 406 includes a text format section 408, a binary format section 410, and a metadata section 412. When the ML producer 114 initiates a request to write a text format ML document including ML data in a text format to the ML file manager 402, the MFDO I/F 404 can create a new MFDO 406 or modify an existing MFDO 406. The ML producer 114 may include a flag, argument, or other means to inform the ML file manager 402 that the MFDO 406 is to be created or modified, as opposed to a traditional uniform text or binary format file. The MFDO I/F 404 writes the text format ML document to the text format section 408 of the MFDO 406.

In exemplary embodiments, the ML file manager 402 initiates a call to the ML parser 118 in a similar manner as previously described in reference to the ML file manager 112 of FIG. 1, to translate the text format ML data to parsed binary format ML data. Instead of writing the parsed binary format ML data to the data storage device 108 as the parsed binary format ML document 120, the MFDO I/F 402 writes the parsed binary ML document in the binary format section 410 of the MFDO 406. The parsed binary ML document within the binary format section 410 provides a parsed representation of the text format ML document in the text format section 408 to ML consumers, such as the ML consumer 122. When the ML consumer 122 requests to read the ML document embodied within the MFDO 406, the MFDO I/F 404 locates the binary format section 410 of the MFDO 406 and returns the parsed binary representation of the ML document to the ML consumer 122 in response to the request.

The metadata section 412 of the MFDO 406 may include one or more pointers providing access to the text format section 408 and/or the binary format section 410, such as pointers 414 and 416. In alternate exemplary embodiments, the text format section 408 and/or the binary format section 410 are at fixed offsets relative to the MFDO 406, such that one or more of the pointers 414 and 416 are not needed. Thus, access to the text format section 408 and the binary format section 410 may be achieved through a combination of the pointers 414 and 416, as well as fixed offset values, to locate each section of the MFDO 406. The metadata section 412 may also include various statistics associated with contents of the ML document held within the MFDO 406. The statistics may be generated using the ML parser 118 or the MFDO I/F 404 to summarize the information in the ML document held within the MFDO 406. For example, upon parsing, information such as data types, number of objects, object size, version information, encoding, and the like can be extracted from text formatted ML data or determined as the resulting parsed binary ML document is generated and written to the binary format section 410 of the MFDO 406. Additional statistical information within the metadata section 412 may include indicators describing the characteristics of the parsing operations performed. For example, these could indicate whether the ML was validated during the parse, or whether comments or insignificant whitespace were stripped. Contents of the metadata section 412 may be returned to the ML consumer 122 upon a request via the MFDO I/F 404. The contents of the metadata section 412 can also be made available to the file system 110 for use by other low-level services (not depicted) on the host system 102.

Figure 5:
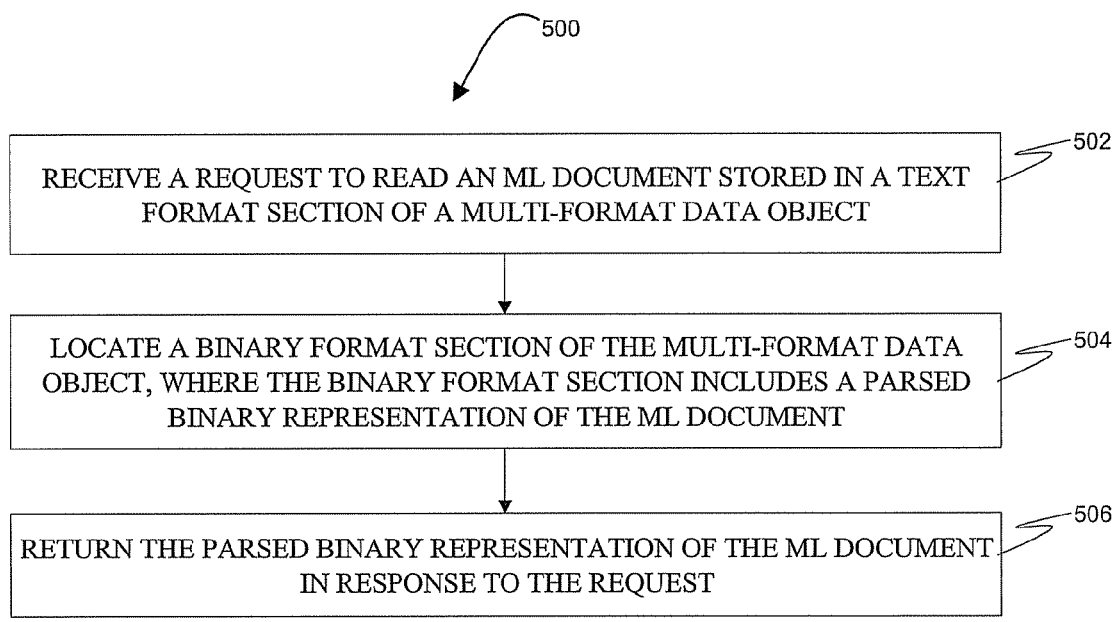
FIG. 5 depicts an exemplary process for accessing a multi-format data object that tightly binds an ML document in a text format to a parsed binary representation of the ML document.

Turning now to FIG. 5, a process 500 for accessing a multi-format data object will now be described in accordance with exemplary embodiments, and in reference to the system 400 of FIG. 4. In exemplary embodiments, the MFDO 406 provides a tightly bound multi-format data object, binding an ML document in a text format to a parsed binary representation of the ML document. The MFDO 406 keeps the text and binary formats for the ML document together, which can prevent potential version mismatches and loss/recovery issues that may occur if separate text and binary files are employed. While either the text format section 408 or the binary format section 410 can be accessed to read or write a text or binary representation of an ML document, in exemplary embodiments a read request from the ML consumer 122 returns the parsed binary representation of the ML document for direct use by the ML consumer 122. At block 502, the MFDO I/F 404 of the ML file manager 402 receives a request to read an ML document stored in a text format section 408 of the MFDO 406.

At block 504, the MFDO I/F 404 of the ML file manager 402 locates the binary format section 410 of the MFDO 406, where the binary format section 410 includes a parsed binary representation of the ML document. The MFDO I/F 404 may use information in the metadata section 412, such as the pointer 416, to locate the binary format section 410 of the MFDO 406.

At block 506, the MFDO I/F 404 of the ML file manager 402 returns the parsed binary representation of the ML document from the binary format section 410 in response to the request. The MFDO I/F 404 of the ML file manager 402 may also return information from the metadata section 412, such as statistics associated with the ML document held within the MFDO 406.

Technical effects of exemplary embodiments include automatic parsing of an ML document upon a write request from an ML producer, saving a persistent version as a parsed binary ML document. Additional technical effects include returning the parsed binary ML document to an ML consumer upon a read or access request, such that the ML consumer avoids directly initiating ML parsing. Advantages may include a rapid response time between an ML consumer request for an ML document and returning the parsed binary ML document to the ML consumer, as the ML consumer does not have to wait for parsing to complete. Since the actual parsing of the ML document is avoided at read time, this may reduce delays and increase efficiency for ML documents that are written to a file system once, and referenced many times. Further advantages include providing a simplified interface to ML producers and consumers that eliminates the need for direct interfacing with an ML parser. The burden on users may also be reduced, through simply copying a text format ML document to the file system, and reading a parsed form of the ML document back out, instead of dealing directly with a complex ML parser interface.

Further technical effects include providing access to a multi-format data object to tightly bind a text format ML document with a parsed binary format. The multi-format data object may return an ML document in a text format or a parsed binary format, as well as other information associated with the ML document. Advantages include managing multiple formats of the ML document as a single entity, which simplifies file management, as well as reduces risks of text and binary file version misalignment and recovery.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for automatic parsing of a markup language (ML) document, comprising:

receiving a request from an ML producer to write an ML document including ML data in a text format at an ML file manager;

passing the ML data in the text format from the ML file manager to an ML parser, wherein the ML parser translates the ML data in the text format into a parsed binary format;

writing the ML data in the text format as a text format ML document to a data storage device by the ML file manager;

receiving the ML data in the parsed binary format at the ML file manager from the ML parser; and writing the ML data in the parsed binary format as a parsed binary format ML document to the data storage device by the ML file manager;

wherein the ML data in the text format and the ML data in the parsed binary format are stored in a single multi-format data object on the data storage device comprising a one-to-one relationship between the ML data of the ML document in the text format and the ML data of the ML document in the parsed binary format, read and write operations are performed on both the text format and the parsed binary format by accessing the single multi-format data object, and additional ML documents are managed by the ML file manager as separate multi-format data objects each comprising text format and parsed binary format ML data in the one-to-one relationship per object.

2. The method of claim 1 wherein the request to write the ML document is received via a file system as an option passed with a file open command.

3. The method of claim 1 wherein the request to write the ML document is interpreted by a file system as a function of a file extension of the ML document.

4. The method of claim 1 further comprising:
receiving a request from an ML consumer to read the ML document;
reading the ML data in the parsed binary format from the parsed binary format ML document; and
returning the ML data in the parsed binary format to the ML consumer.

5. The method of claim 4 wherein the request to read the ML document is received via a file system as an option passed with a file open command.

6. The method of claim 1 wherein the method is accessible as an application program interface (API) service, relieving an ML consumer from directly initiating the ML parser on each ML document read request.

7. The method of claim 1 further comprising:
receiving statistics of the ML document at the ML file manager generated by the ML parser, the statistics summarizing information in the ML document help within the single multi-format data object and describing characteristics of parsing operations performed by the ML parser; and
storing the statistics as metadata in the single multi-format data object, wherein an access request for information held in the ML document returns the information from the ML data in the parsed binary format and the metadata is returned based on a request for the metadata.

8. A system for automatic parsing of a markup language (ML) document, comprising:
a host system in communication with a data storage device; and
an ML file manager executing upon the host system, the ML file manager performing:
receiving a request from an ML producer to write an ML document including ML data in a text format at the ML file manager;
passing the ML data in the text format from the ML file manager to an ML parser, wherein the ML parser translates the ML data in the text format into a parsed binary format;
writing the ML data in the text format as a text format ML document to the data storage device by the ML file manager;
receiving the ML data in the parsed binary format at the ML file manager from the ML parser; and
writing the ML data in the parsed binary format as a parsed binary format ML document to the data storage device by the ML file manager;
wherein the ML data in the text format and the ML data in the parsed binary format are stored in a single multi-format data object on the data storage device comprising a one-to-one relationship between the ML data of the ML document in the text format and the ML data of the ML document in the parsed binary format, read and write operations are performed on both the text format and the parsed binary format by accessing the single multi-format data object, and additional ML documents are managed by the ML file manager as separate multi-format data objects each comprising text format and parsed binary format ML data in the one-to-one relationship per object.

9. The system of claim 8 wherein the request to write the ML document is received via the ML file manager as an option passed with a file open command.

10. The system of claim 8 wherein the request to write the ML document is interpreted by the ML file manager as a function of a file extension of the ML document.

11. The system of claim 8 wherein the ML file manager further performs:
receiving a request from an ML consumer to read the ML document;
reading the ML data in the parsed binary format from the parsed binary format ML document; and
returning the ML data in the parsed binary format to the ML consumer.

12. The system of claim 11 wherein the request to read the ML document is received via the ML file manager as an option passed with a file open command.

13. The system of claim 8 wherein the ML file manager is integrated in a file system as an application program interface (API) service, relieving higher-level applications from directly initiating the ML parser on each ML document read request.

14. The system of claim 8 wherein the ML file manager further performs:
receiving statistics of the ML document at the ML file manager generated by the ML parser, the statistics summarizing information in the ML document held within the single multi-format data object and describing characteristics of parsing operations performed by the ML parser; and
storing the statistics as metadata in the single multi-format data object, wherein an access request for information held in the ML document returns the information from the ML data in the parsed binary format add the metadata is returned based on a request for the metadata.

15. A computer program product for automatic parsing of a markup language (ML) document, the computer program product comprising:
a non-transitory storage medium readable by a processing circuit and storing instructions for execution by the processing circuit for implementing a method, the method comprising:
receiving a request from an ML producer to write an ML document including ML data in a text format at an ML manager;
passing the ML data in the text format from the ML file manager to an ML parser, wherein the ML parser translates the ML data in the text format into a parsed binary format;
writing the ML data in the text format as a text format ML document to a data storage device by the ML file manager;
receiving the ML data in the parsed binary format at the ML file manager from the ML parser; and
writing the ML data in the parsed binary format as a parsed binary format ML document to the data storage device by the ML file manager;
wherein the ML data in the text format and the ML data in the parsed binary format are stored in a single multi-format data object on the data storage device comprising a one-to-one relationship between the ML data of the ML document in the text format and the ML data of the ML document in the parsed binary format, read and write operations are performed on both the text format and the parsed binary format by accessing the single multi-format data object, and additional ML documents are managed by the ML file manager as separate multi-format data objects each comprising text format and parsed binary format ML data in the one-to-one relationship per object.

16. The computer program product of claim 15 wherein the request to write the ML document is received via a file system as an option passed with a file open command.

17. The computer program product of claim 15 wherein the request to write the ML document is interpreted by a file system as a function of a file extension of the ML document.

18. The computer program product of claim 15 further comprising:
receiving a request from an ML consumer to read the ML document;
reading the ML data in the parsed binary format from the parsed binary format ML document; and
returning the ML data in the parsed binary format to the ML consumer.

19. The computer program product of claim 18 wherein the request to read the ML document is received via a file system as an option passed with a file open command.

20. The computer program product of claim 15 further comprising:
receiving statistics of the ML document at the ML file manager generated by the ML parser, the statistics summarizing information in the ML document held within the single multi-format data object and describing characteristics of parsing operations performed by the ML parser; and
storing the statistics as metadata in the single multi-format data object, wherein and access request for information held in the ML document returns the information form the ML data in the parsed binary format and the metadata is returned based on a request for the metadata.

* * * * *